(12) United States Patent
Miyano

(10) Patent No.: US 6,832,309 B2
(45) Date of Patent: Dec. 14, 2004

(54) GENERATION OF MODIFIED COMMANDS REPEATEDLY FROM FEEDBACK OR BASE COMMAND

(75) Inventor: Tomomi Miyano, Miyazaki (JP)

(73) Assignee: Oki Electric Industry Co., Ltd., Tokyo (JP)

(*) Notice: Subject to any disclaimer, the term of this patent is extended or adjusted under 35 U.S.C. 154(b) by 479 days.

(21) Appl. No.: 09/781,561

(22) Filed: Feb. 13, 2001

(65) Prior Publication Data

US 2001/0042196 A1 Nov. 15, 2001

(30) Foreign Application Priority Data

Feb. 14, 2000 (JP) ........................................ 2000/039802

(51) Int. Cl.$^7$ ................................................. G06F 9/30
(52) U.S. Cl. ........................ 712/226; 712/208; 712/214
(58) Field of Search ............................... 712/208, 226, 712/214

(56) References Cited

U.S. PATENT DOCUMENTS 4,831,572 A * 5/1989 Sekiguchi ................... 708/200
6,434,690 B1 * 8/2002 Ohsuga et al. ................ 712/35

* cited by examiner

Primary Examiner—Kenneth S. Kim
(74) Attorney, Agent, or Firm—Nixon Peabody LLP; Donald R. Studebaker

(57) ABSTRACT

A command processing device includes first and second storing circuits, a decode circuit and a generating circuit. The first storing circuit stores a command. The decode circuit decodes the command from the first storing circuit and outputs a decoded command and a control signal. The generating circuit receives the command from the first storing circuit, generates a new command in response to the control signal, and outputs the new command to the first generating circuit. The second storing circuit stores an original command. The generating circuit receives the original command from the second storing circuit and outputs the original command to the first storing circuit.

9 Claims, 15 Drawing Sheets

| COMMAND MNEMONIC | COMMAND FIELD |
|---|---|
| PUSH R3, [SP+] | `1 1 1 1 1 0 0 0 0 0 1`<br>  30    31    32<br>       (R3)  (SP) |

HIGHER        PRIORITY        LOWER

| CONTENTS OF FIRST OPERAND FIELD | | | | SELECTED REGISTER |
|---|---|---|---|---|
| 1 | X | X | X | R3 |
| 0 | 1 | X | X | R2 |
| 0 | 0 | 1 | X | R1 |
| 0 | 0 | 0 | 1 | R0 |

FIG. 7

| VALUE OF COMMAND FIELD 30 | COMMAND |
|---|---|
| 1111 | MOV |
| 1110 | STORE |

| VALUE OF COMMAND FIELD 30 | VALUE OF FIRST OPERAND FIELD 31 | COMMAND |
|---|---|---|
| 1110 | 0000 | LOD |

| | THE CONTENTS OF<br>THE COMMAND REGISTER 115 |
|---|---|
| STATE 1 | 1 1 1 1 1 0 0 0 0 0 0 1<br>　30　　31　　　32 |
| STATE 2 | 1 1 1 0 1 0 0 0 0 0 0 1 |
| STATE 3 | 1 1 1 0 0 0 0 0 0 0 0 1 |

FIG. 15

| VALUE OF FIELD 70 | COMMAND |
|---|---|
| 1111 | MOV AR,RX |
| 1110 | PUSH Rn |
| 1010 | LOD |

# GENERATION OF MODIFIED COMMANDS REPEATEDLY FROM FEEDBACK OR BASE COMMAND

BACKGROUND OF THE INVENTION

1. Field of the Invention

The present invention generally relates to a command processing device that performs a predetermined processing based on a command stored in a memory device. The present invention also relates to a method for processing a command.

This application is a counterpart of Japanese patent application Serial Number 39802/2000, filed Feb. 14, 2000, the subject matter of which is incorporated herein by reference.

2. Description of the Related Art

In a command processing device, one command is processed by two or more following states. First, a command code (hereinafter "command") is fetched from an external memory device, such as a ROM. Next, the command is decoded. Then, the decoded command is executed. In a state by which the command is executed, a write-in operation of the command to a command register, etc. is contained. There is a technology that improves a performance of the command processing device performing the above state. The technology is referred to as command fetch pipeline processing (hereinafter "pipeline processing"). In the pipeline processing, a plurality of commands are divided into the states, thus the commands are processed in parallel. According to pipeline processing, it is possible to shorten the time required in order to perform a program.

One example of the conventional command processing device 300, which performs the above mentioned pipeline processing, is explained with referring to FIG. 18. One command in this command processing device 300 is processed by passing through a state (IF state) in which a command is fetched, a state (ID state) in which the fetched command is decoded, and a state (EX state) in which the decoded command is executed and written in a register. In addition, the command which the above three states comprised of and ends within one machine cycle is referred to as the minimum execution cycle command.

As shown in FIG. 18, the command processing device 300 is made up of an IF state part 310, an ID state part 320, and an EX state part 330.

The IF state part 310 includes a memory device 311, a control device 312 which designates an address location in the memory device 311, an incrementor 313, a selector 314 which is connected to the incrementor 313 and an Arithmetic and Logic Unit 331 (it is called ALU hereinafter) explained later and which selects either an output of the ALU 331 or an output of the incrementor 313, and a command storing register 315.

The ID state part 32 includes a command decoded 321 which is comprised of a logic circuit and which decodes an execution command stored in the command storing register 315, a register file 322 which stores an operation result and the object an "operand") of operation, a RAM 323 which stores an operation result and an operand, a selector 324 which selects either an output of the register file 322 or an output of the RAM 323, a storing register 325 which feeds back an operand to be performed, and an address register 326 which feeds back an output of the storing register 325 to the RAM 323. The command decoder 321 outputs a control signal for executing a command to the register file 322 and the address register 326.

The EX state part 330 is constituted by the ALU 331. The ALU 331 inputs a command and an operand from the storing register (not illustrated) in the ID state part 320 and performs a predetermined operation. Then, the ALU 331 outputs the operation result to the register file 322 and the RAM 323 in the II) state part 320 and controls the selector 314 in the IF state part 310.

As mentioned above, each state of the command is processed by the corresponding structure element in the command processing device 300. According to the above structure, while one state under one command is performed, another state under another command can be performed. That is, it is enabled to perform pipeline processing.

FIG. 19 is a timing chart showing a processing time when the pipeline processing with respect to commands 1 through 4, wherein each of the commands is the minimum execution cycle command, are executed. For example, at the processing time t, the EX state of the command 1, the ID state of the command 2, and the IF state of the command 3 are simultaneously performed. As mentioned above, by dividing commands into states, parallel processing of two or more commands can be carried out. Thus, commands are processed in parallel. According to the pipeline processing, it is possible to shorten the whole processing time.

By the way, in order to shorten the whole processing time in the above mentioned pipeline processing, the time of each state needs to be made as short as possible and equal. That is, when one state is very long compared with another state, the whole processing time depends on the processing time of the one state. As a result, the original purpose of shortening the time required for executing a program can not be obtained.

As architecture of the command processing device generally used, there are RISC (Reduced Instruction Set Computer) and CISC (Complex Instruction Set Computer). These have the following features. That is, in RISC, while there is an advantage that command decoding time and command execution time are short because each command is simple, there is a disadvantage that command read out time is long.

In CICS, although there is an advantage that command read out time is short because CISC includes the complicated command decoding mechanism, there is a disadvantage that command decoding time and command execution time are long. Thus, from the viewpoint of equalization of the processing time of each state, neither RISC nor CISC is suitable architecture. Consequently, there has been a need for a new architecture having each advantage.

SUMMARY OF THE INVENTION

It is an object of the present invention is to provide a command processing device that can execute a command efficiently.

It is still another object of the present invention is to provide a command processing device having a simplified structure.

It is still another object of the present invention is to provide a command processing device having a smaller circuit area.

It is still another object of the present invention is to provide a method for processing command that can improve a processing time.

According to one aspect of the present invention, for achieving one or more of the above objects, there is provided a command processing device that includes a first command storing circuit which stores a command and a decode circuit which decodes the command from the first command storing circuit and which outputs a decoded command and a control signal. The device also includes a command generating circuit which receives the command from the first command storing circuit, which generates a command in response to the control signal, and which outputs generated command to the decode circuit.

According to another aspect of the present invention, for achieving one or more of the above objects, there is provided a method for processing command that includes the following steps. That is, the method includes generating a first command composed of a plurality of bits; decoding the first command; executing a predetermined process based on the decoded first command; generating a second command by using the first command based on the decoded result of the first command; decoding the second command; and executing a predetermined process based on the decoded second command.

The above and further objects and novel features of the invention will more fully appear from the following detailed description, appended claims and the accompanying drawings.

BRIEF DESCRIPTION OF THE DRAWINGS

FIG. 7 is a table explaining a command MOV and a command STORE.

FIG. 15 is a table explaining a command MOV AR, RX, a command PUSH Rn, and a command LOD.

DETAILED DESCRIPTION OF THE PREFERRED EMBODIMENTS

Figure 1:
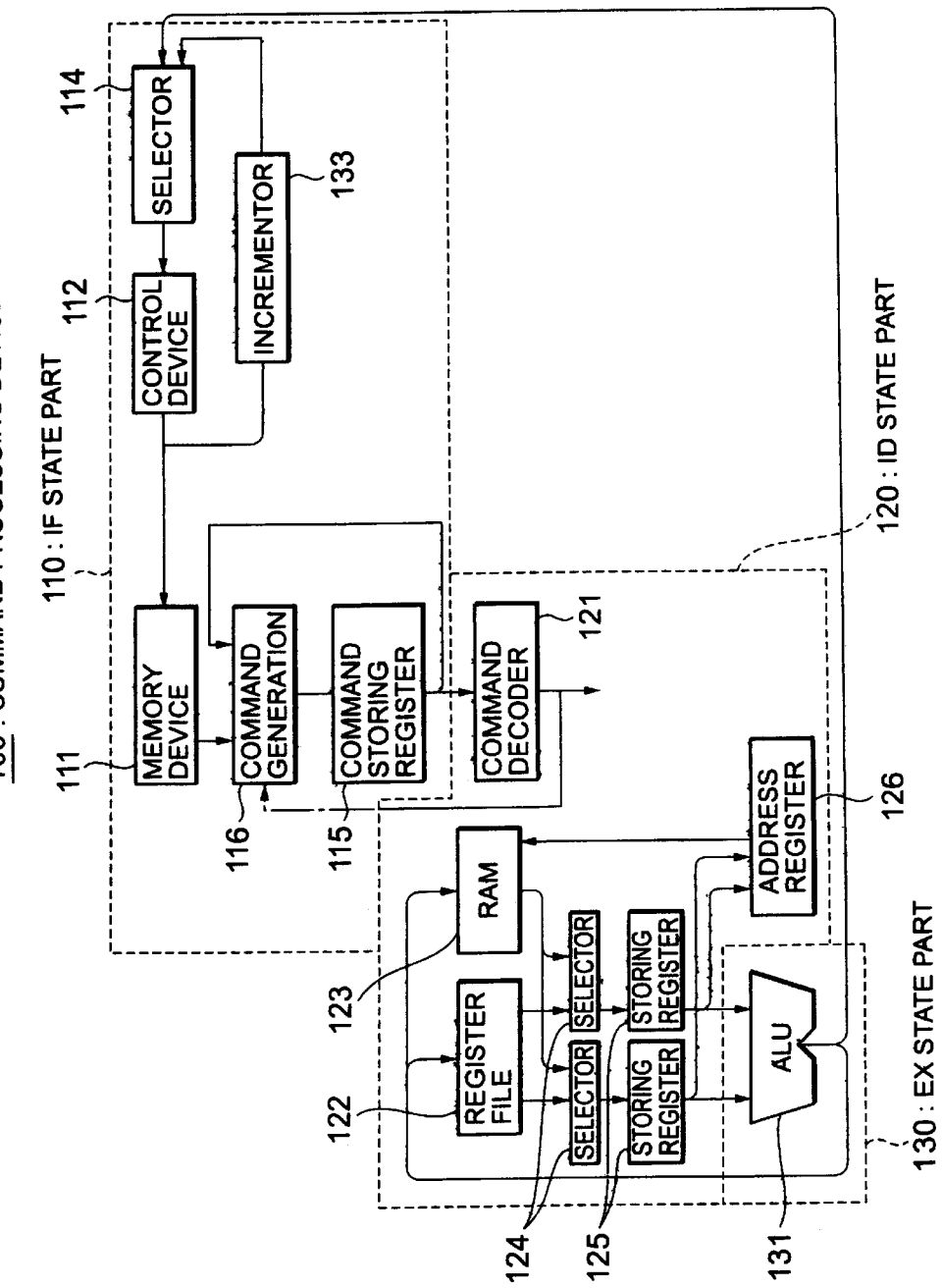
FIG. 1 is a block diagram showing a command processing device 100 according to a first preferred embodiment of the present invention.

A command processing device according to preferred embodiments of the present invention will be explained hereinafter with reference to figures. In order to simplify explanation, like elements are given like or corresponding reference numerals through this specification and figures. Dual explanations of the same elements are avoided.

First Preferred Embodiment

The command processing device 100 according to a first preferred embodiment of the present invention is now explained with reference to FIG. 1.

The command processing device 100 is a device that performs the pipeline processing with respect to the minimum execution cycle command like the case of the above mentioned conventional technology The command processing device 100 includes an IF state part 110 which fetches a command, an ID state part 120 which decodes the fetched command, and an EX state part 130 which executes the decoded command and which performs writing operation to a register.

(IF State Part 110)

Like the IF state part 310 of the above-mentioned conventional command processing device 300, the IF state part 110 includes a memory device 111 which stores a command code, a control device 112 which identifies an address location in the memory device 111, an incrememtor 113, a selector 114 which is connected to the incrementor 113 and ALU 131 and which selects either an output of the ALU 113 or an output of the incrementor 113, and a command storing register 115. In this embodiment, the command code consists of 12 bits. Furthermore, the IF state part 110 has a command generation means 116 which receives the command code read from the memory device 111 and the command code stored in the command storing register 115. The command generation means 116 generates a new command code according to the received command storing register 115

In this embodiment, the command generation means 116 generates such new command code under control of a command decoder 121 explained later. The command generated by this command generation means 116 is stored in the command storing register 115 as a command to be executed next. About the algorithm of the command generation by this command generation means 116 is explained later.

(Command Generation Means 116)

Figures 2, 3:
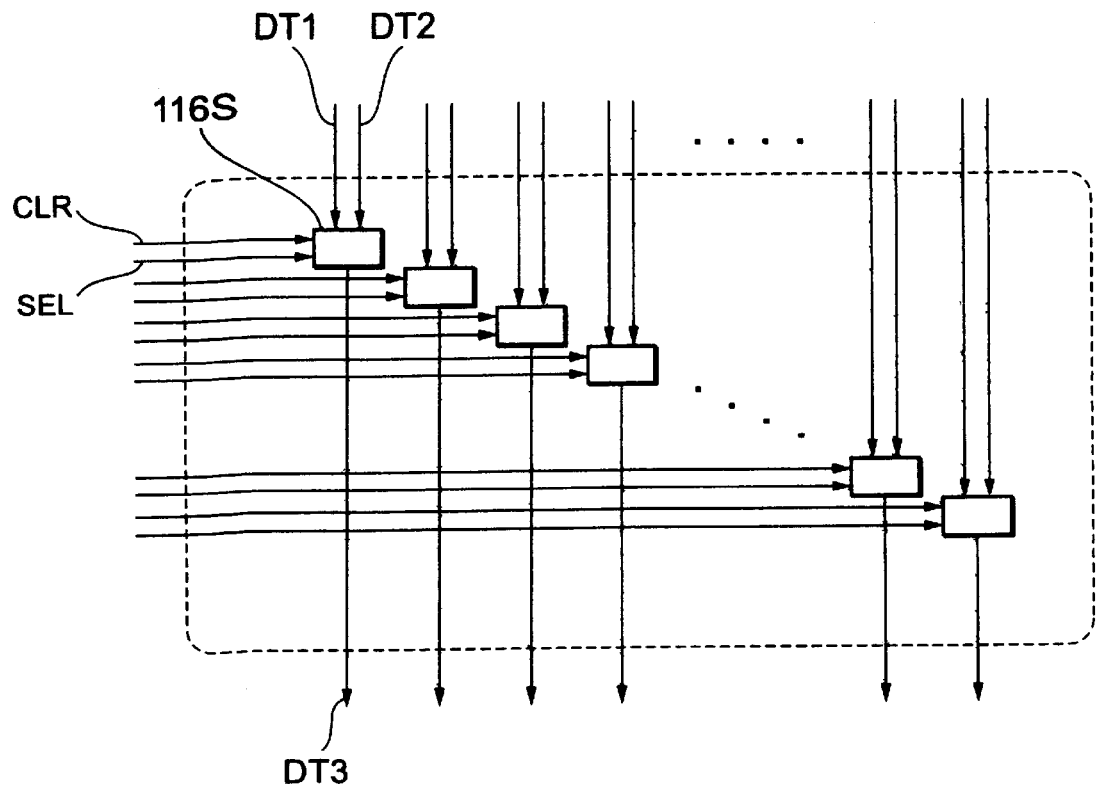
FIG. 2 is a block diagram showing a command generating means 116 according to a first preferred embodiment of the present invention.
FIG. 3 is a figure explaining a command PUSH.

A command generation means 116 has selectors 116s each of which corresponds to respective bits of a command code, as shown in FIG. 2. In order to simplify explanation, illustration of a part of selector 116s is omitted. In addition, although FIG. 2 shows the case where a command code is 12 bits, it is also possible to constitute the command generation means 116 so that the command code of the predetermined numbers of bits can be suited.

Each selector 116s receives a clear signal CLR, (which clears the bit of the command code) output from the command decoder 112, and an output data selection signal SEL output from the command decoder 121. Each selector 116s also receives the command code i.e., a data DT1 stored in the address location at which the control device 112 now identifies, output from the memory device 111. Furthermore, each selector 116s receives a data DT2 corresponding to each bit of the command storing register 115.

Each selector 116s which constitutes the command generation means 116 outputs either the data DT1 read out from the memory device 111 or the data DT2 output from the command storing register 115 as a data DT3 in response to the state of a select signal SEL. When each selector 116s receives the clear signal CLR, the selector 116s outputs data "0" as the DT3 regardless of data DT1 and data DT2. Each data DT3 is output to corresponding bit of the command storing register 115.

(Command Storing Register 115)

The command storing register 115 comprises latch circuits for storing bits which constitute a command code. That is, the command storing register 115 has two or more latch circuits which input and latch data DT3. Each bit of the command storing register 115 is set to "1" or is reset "0" by the data DT3 output from the command generation means 116.

(ID State Part 120)

Like the ID state part 320 of the above mentioned conventional command processing device 300, the ID state part 120 has a command decoder 121 which consists of a logic circuit for decoding an execution command stored in the command storing register 115, and a register file 122 which stores an operation result and a data as the object (operand) of operation. The ID state part 120 further has a RAM 123 which stores an operation result and an operand, a selector 124 which selects and outputs either an output of the register file 122 or an output of the RAM 123, a storing register 125 which stores an operand to be performed, and an address register 126 which feeds the output of the storing register 125 back to the RAM 123.

Such command decoder 121 transfers a control signal for executing the command to the register file 122 and the address register 126. The command decoder 121 further transmits a control signal which indicates whether to generate another command from the decoded command in the ID state part 120 to the command generation means 116. This control signal is a demand for setting each bit of the command field 30 mentioned later to "1" or for resetting them to "0". The structure of the command decoder 121 is suitably designed according to the kind of command stored in memory device 111. The detail structure of the command decoder 121 is explained later.

(EX State Part 130)

Like the EX state part 330 of the above mentioned conventional command processing device 300, the EX state part 130 is constituted by an ALU 131. The ALU131 inputs the command and the operand output from the command storing register 115 in the ID state part 120, and performs a predetermined operation. Then, the ALU131 outputs the operation result to the register file 122 and the RAM 123 in the ID state part 120, and controls the selector 114 in the IF state part 110.

An operation of the command processing device 100 is explained hereinafter. In this embodiment, an example where the following command stored in the memory device 111 is executed by using the command generation means 116 is explained. This command is called Command PUSH hereinafter.

PUSH R3,[SP+]

This command PUSH is performed by using two or more register files which the processor has. In detail, the command PUSH is a command for storing the contents of one register file (R3 register file) to the predetermined region in the memory device, wherein the predetermined region is identified by the contents of another register file (SP register file). Here, the register files, such as SP register file and R3 register file, are collectively indicated as a register file 122 in FIG. 1.

The command code showing the command PUSH is stored in the memory device 111. This command code consists of a total of 12 bits of the 4 bits command field 30, the 4 bits first operand field 31, and the 4 bits second operand field 32, as shown in FIG. 3. Although the width (the number of bits) of each field is arbitrary, the width of each field is explained as 4 bits in this embodiment. This command code stored in the memory device 111 has been transferred to the command storing register 115, and has already been stored in the command storing register 115.

The contents of the register file (R3) identified by the first operand field are stored into the predetermined region of the RAM 123, wherein the predetermined region is identified by the contents of the register file (SP) identified by the second operand field 32.

Next, the first operand field 31, the second operand field 32, and the relationship between these operand field and the register file 122 are explained briefly.

Figure 4:
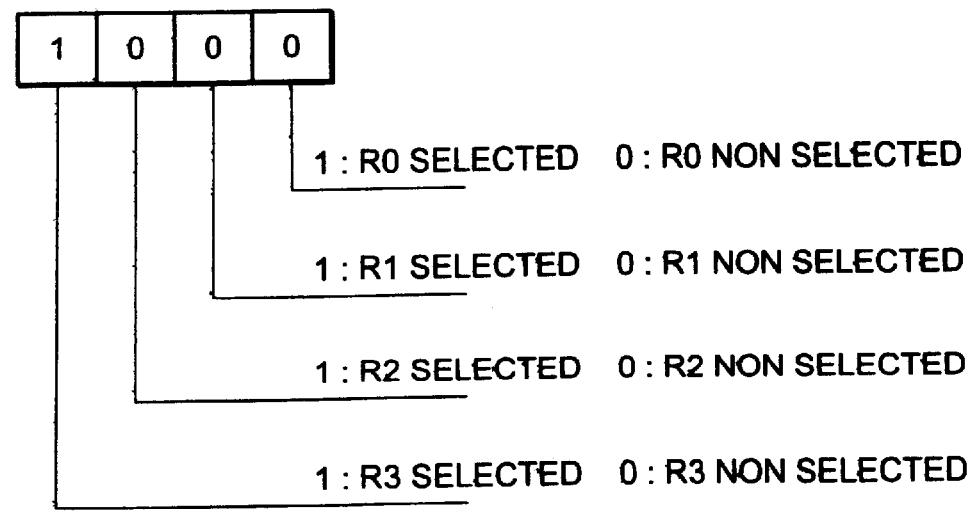
FIG. 4 is a figure showing the relationship between the contents of a first operand field 31 and selected register.
Figure 4:
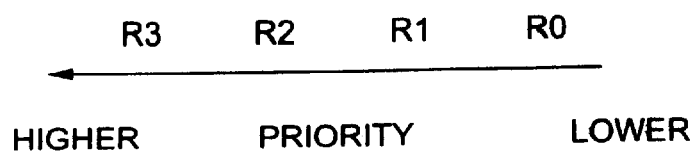

The first operand field 31 is the field for specifying (or recognizing) whether which register file of register files in the processor is set as the object of operation. As shown in FIG. 4, each register file is assigned to each bit. In detail, the R3 register, the R2 register, the R1 register, and the R0 register are assigned in the order of the highest bit to the lowest bit. It means that the register file assigned to the bit set to 1 is an object of operation, and means that the register file assigned to the bit reset to 0 is not the object of operation.

Figures 5, 6:
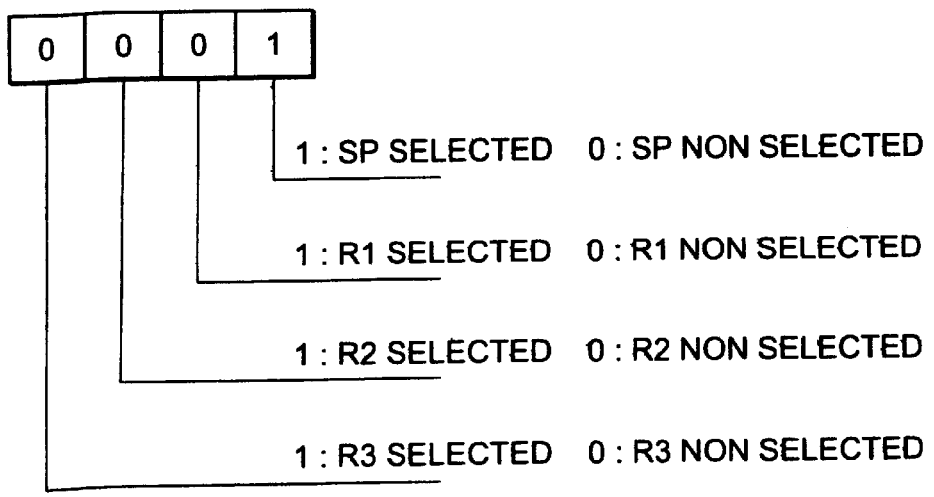
FIG. 5 is a table showing the relationship between the contents of a first operand field 31 and selected register.
FIG. 6 is a figure showing the relationship between the contents of a second operand field 32 and selected register.

Moreover, in consideration of case where register files are specified during one command, the priority is attached to each bit of the first operand field 31 as shown in FIG. 5. As shown in FIG. 5, when the highest bit of the first operand field 31 is set to 1, the R3 register is selected regardless of the value of other bits. When the highest bit of the first operand field 31 is set to 0 and the second bit from the highest bit is set to 1, the R2 register is selected regardless of the value of other bits. When the highest bit and the second bit from it of the first operand field 31 are set to 0 and the third bit from the highest bit is set to 1, the R1 register is selected regardless of the value of other bits. When the highest bit, the second and the third bits from it of the first operand field 31 are set to 0 and the lowest bit is set to 1, the R0 register is selected regardless of the value of other bits.

As mentioned above, the selection of the register with the highest priority is judged in the position of the bit set to 1 in the first operand field 31. Here, the mark x in FIG. 5 means that the command decoder 121 does not refer to the contents of the first operand field 31.

The command decoder 121 selects the register file corresponding to the bit with the highest priority, and outputs this information to the EX state part 130 as the register for operation. Furthermore, the command decoder 121 gives the demand which clears the bit with the highest priority in the bits to which 1 are set in the first operand field 31 to the command generation means 116. That is, the demand which deletes the register file information output to the EX state part 130 from the first operand field 31 is given to the command generation means 116.

The command generation means 116 performs set or reset of the bit in which the command field 31 is specified in response to the demand of the command decoder 121. Thereby, the register file used as the object of operation can be changed. For example, the contents of the first operand field 31 assume that it is 1010. In this case, the R3 register with the higher priority is selected first. Then, when the clear demand is given to the command generation means 116, the next selected register file is changed to the R1 register. It is possible to change selection of the register from the register file with higher priority to the register file with lower priority dynamically, while executing the same command. As shown in FIG. 6, a plurality of register files are assigned to corresponding bits of the operand field 32 like the first operand field 31.

Figures 8, 9:
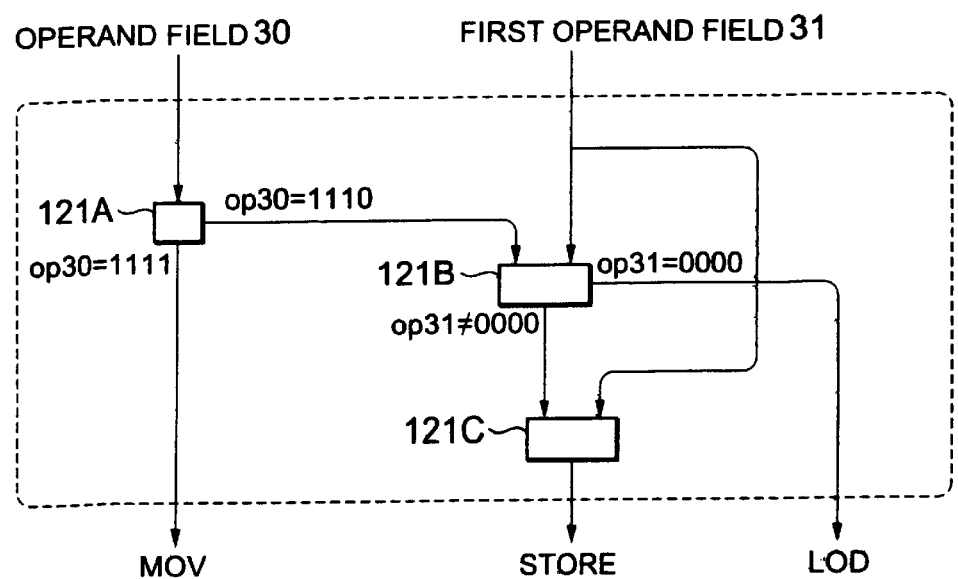
FIG. 8 is a table explaining a command LOD.
FIG. 9 is a block diagram showing a command decoder 121 according to a first preferred embodiment of the present invention.

In order to perform the command PUSH, a command MOV, a command STORE, and a command LOD are sequentially executed. The command MOV, the command STORE, and the command LOD are explained with reference to FIG. 7 and FIG. 8. The command MOV and the command STORE in the command processing device 100 are distinguished by the value of the command field 30 as shown in FIG. 7. The command LOD in the command processing device 100 is distinguished by the value of the command field 30 and the value of the first operand field 31 as shown in FIG. 8.

The command MOV is a command that is executed when the value of the command field 30 is 1111. The command MOV performs the following operation.

(Operation 1)

The contents of the register file (SP) identified by the second operand field 32 are transferred to the address register 126.

(Operation 2)

A demand that the lowest bit of the command field 30 is cleared to 0 is issued to the command generation means 116. The demand of clearing the lowest bit of the command field 30 to 0 changes the value of the command field 30 to 1110 from 1111. When 1110 of the command field 30 is set to the 9th through the 12th bit of the command storing register 115 through the command generation means 116, the command next executed will change from the command MOV to the command STORE. That is, performing the demand which clears the lowest bit of the command field 30 to 0 means that the following command is changed from the command MOV to the command STORE.

The Command STORE is a command that is executed when the value of the command field 30 is 1110. The command STORE performs the following operation.

(Operation 1)

The contents of the register with the highest priority (the R3 register in this example) among the register files selected in the first operand field 31 as the register for operation are transferred to the specific address location in the memory device 111, wherein the specific address location is specified by the address register 126.

(Operation 2)

The clear demand of the bit (the highest bit of the first operand field 31 in this example) to which the register with the highest priority (the R3 register in this example) is assigned is issued to the command generation means 116, wherein the register with the highest priority is among the register files selected as the register for operation in the first operand field 31.

(Operation 3)

+1 increment of the contents of the address register 126 is carried out.

While the command decoder 121 transfers the control signal for executing the command to latter the EX state part 130, it transfers a control signal which determines whether to generate another command code from the command code to the command generation means 116. This control signal is set/reset demand to each bit of the command field 30. The command generation means 116 performs set/reset of the command field 30 in response to the demand of the command decoder 121. An example of the structure of the command decoder 121 which performs such operation is explained with reference to FIG. 9.

(Command Decoder 121)

The command decoder 121 is made up of a command judgment circuit 121a which judges the value of the command field 30, a command judging circuit 121b, and a register selection circuit 121c for the highest priority, as shown in FIG. 9. The value of the command field 30 is inputted into the command judgment circuit 121a. When the value of the command field 30 is 1111, the command judgment circuit 121a outputs a control signal MOV for executing the command MOV shown in FIG. 7, respectively to the register file 122 (SP register), the address register 126, and the command generation means 116.

Moreover, when the value of the command field 30 is 1110, the command judgment circuit 121a outputs a signal indicating this information to the command judging circuit 121b. The value of the first operand field 31 is further inputted into the command judging circuit 121b. When the value of the command field 30 is 1110 and the value of the first operand field 31 is 0000, the command judging circuit 121b outputs a control signal LOD for executing the command LOD shown in FIG. 8 to the address register 126 and the command generation means 116, respectively.

The contents of the address register 126 are transferred to the register file (SP) identified by the second operand field 32.

When the value of the command field is 1110 and the value of the first operand field 31 is not 0000, the command judging circuit 121b outputs a signal indicating this information to the register selection circuit 121c. The register selection circuit 121c outputs a control signal STORE for performing the command STORE shown in FIG. 7 to the address register 126 and the command generation means 116, respectively.

Next, the actual flow of processing a command is explained with reference to FIG. 10. The 12 bits command code read from the memory device is first stored in the command storing register 115 through the command generation means 116. The command code stored in the command storing register 115 is decoded by the command decoder 121 in the ID state part 110 as the command MOV Then, the EX state part 130 executes the command MOV. At this time, the command decoder 121 outputs the control signal (clear signal CLR) for clearing the lowest bit of the command field 30 to 0 to the command generation means 116. The command generation means 116 sets corresponding outputs DT3 of selector 116s to 0 in response to the clear signal CLR. In addition, the command generation means 116 has received the output of the command storing register 115. Therefore, the bit which should not be cleared among the outputs DT2 of the command storing register 115 is transferred to the command storing register 115 as the output DT3 in response to the output data selection signal SEL. As a result, only the corresponding bit in the command storing register 115 is cleared to 0. That is, it means that the command code is rewritten into the command STORE. The above operation is performed, without reading a new command from the memory device 111. (State 1)

Next, the rewritten command code stored in the command storing register 115 is decoded by the command decoder 121 as the command STORE. Then, the EX state part 130 performs the command STORE. At this time, the command decoder 121 outputs the control signal (clear signal CLR) for clearing the highest bit of the first operand field 31 to 0 to the command generation means 116. The command generation means 116 resets the corresponding output DT3 of the selector 116s to 0 in response to the clear signal CLR. In addition, the command generation means 116 has received the output of the command storing register 115. Therefore, the bit which should not be cleared among the outputs DT2 of the command storing register 115 is transferred to the command storing register 115 as an output DT3 in response to the output data selection signal SEL. As a result, only the corresponding bit of the command storing register 115 is cleared to 0. That is, it means that the command code is rewritten into the command LOD. It performs also without reading a new command from the memory device 111. The +1 increment of the contents of the address register 126 is carried out. (State 2)

Next, the rewritten command code stored in the command storing register 115 is decoded by the command decoder 121 as the command LOD. Then, the EX state part 130 executes the command LOD. At this time, the command decoder 121 notifies that the command PUSH is completed to the command generating means 116 and also demands the command generation means 116 to read a new command from the memory device 111 specified by the control device 112. After this demand, each sector 116s selects DT1 in response to the output data selection signal SEL. (State 3)

Since the command LOD performs a read out demand of a new execution command from the memory device 111, the above command processing using the command generation means 116 completes with an end of the command LOD.

Figures 10, 11:
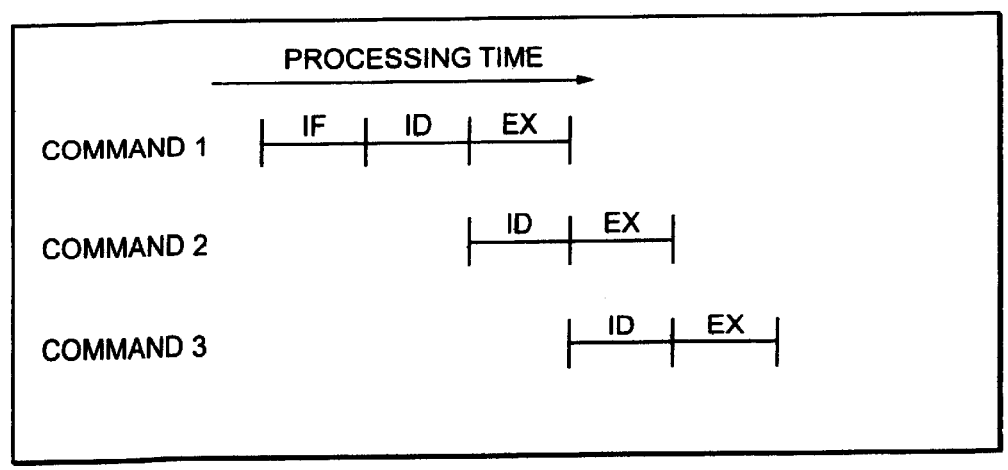
FIG. 10 is a table explaining a command processing flow according to a first preferred embodiment of the present invention.
FIG. 11 is a timing chart showing a processing time of command processing device 100.
Figure 12:
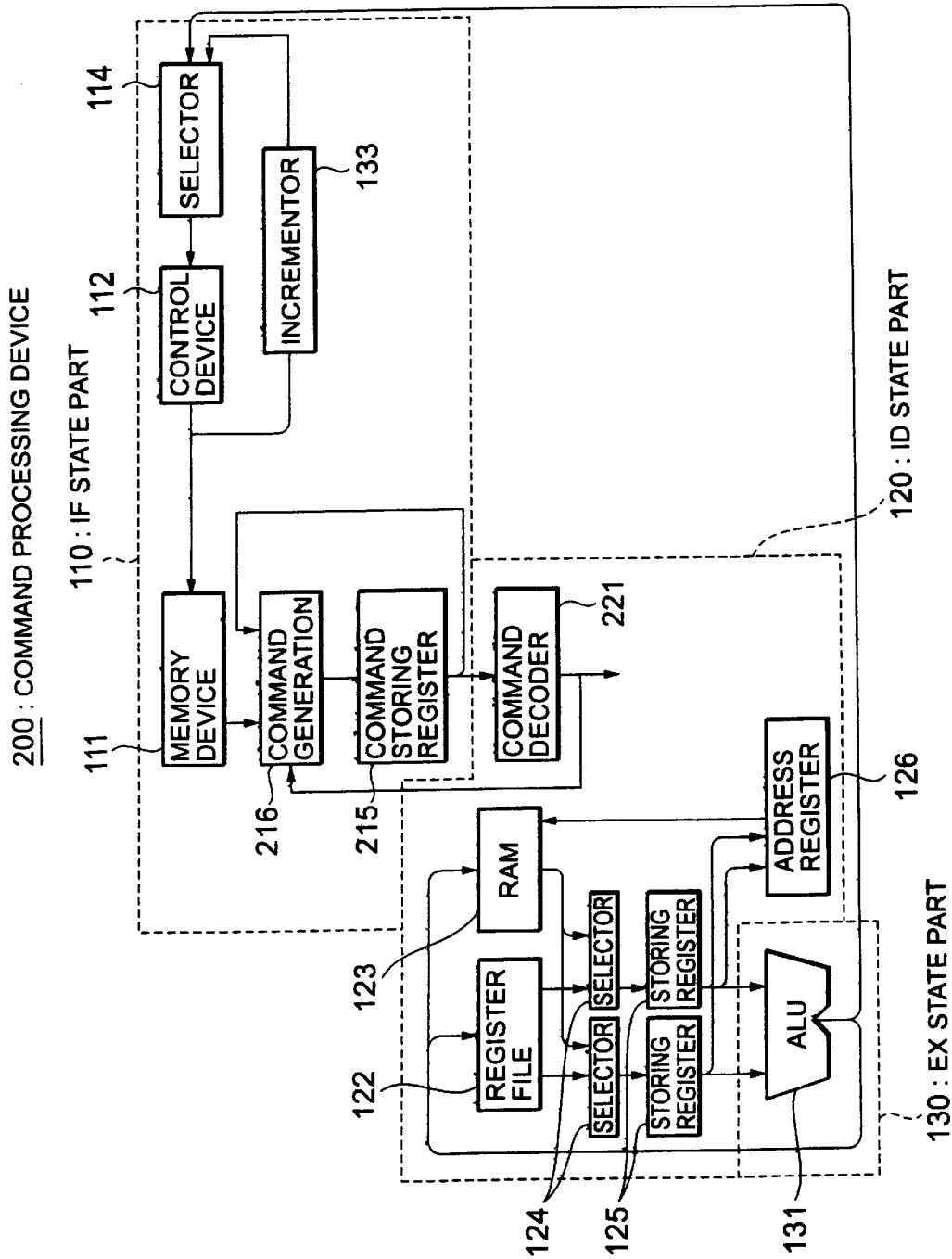
FIG. 12 is a block diagram showing a command processing device 200 according to a second preferred embodiment of the present invention.

FIG. 11 is a timing chart showing the processing time of the command pipeline processing at the time of performing the complex command code in the command processing device 100. In this embodiment, the command code read from memory device 111 is a command code compounded with two or more commands whose bit length do not change. For this reason, the number of times of read out of the command stored in memory device 111 decreases as shown in FIG. 11. This means that the processing speed of a command does not depend on the read out time of a command from the memory device. Consequently, the command processing can be performed efficiently.

Like RISC command, the complex command code is processed in a state that the bit length of its is fixed. Therefore, the complicated mechanism like when decoding a command of a variable length command set is not needed. For this reason, according to this embodiment, circuit area and cost can be reduced.

Furthermore, a means for generating the following command can be obtained by using a relatively simple logic circuit, without using the local memory such as a cache memory having a high-speed interface function. Therefore, according to this embodiment, circuit area can be reduced.

Second Preferred Embodiment

The command processing 200 is a device which modifies the first preferred embodiment. A command generation means 216, a command storing register 215 and a command decoder 221 of the second preferred embodiment replace the command generation means 116, a command storing register 115 and a command decoder 121, respectively.

Since other structure elements of the command processing device 200 are the substantially the same as that of the first preferred embodiment, explanations as to the other structure elements are omitted.

(Command Generation Means 216)

The command generation means 216 generates a new command code under control of the command decoder 221 explained later. The command generated by this command generation means 216 is stored in the command storing register 215 as a command next executed. An algorithm of the command generation by this command generation means 216 is explained later.

Figure 13:
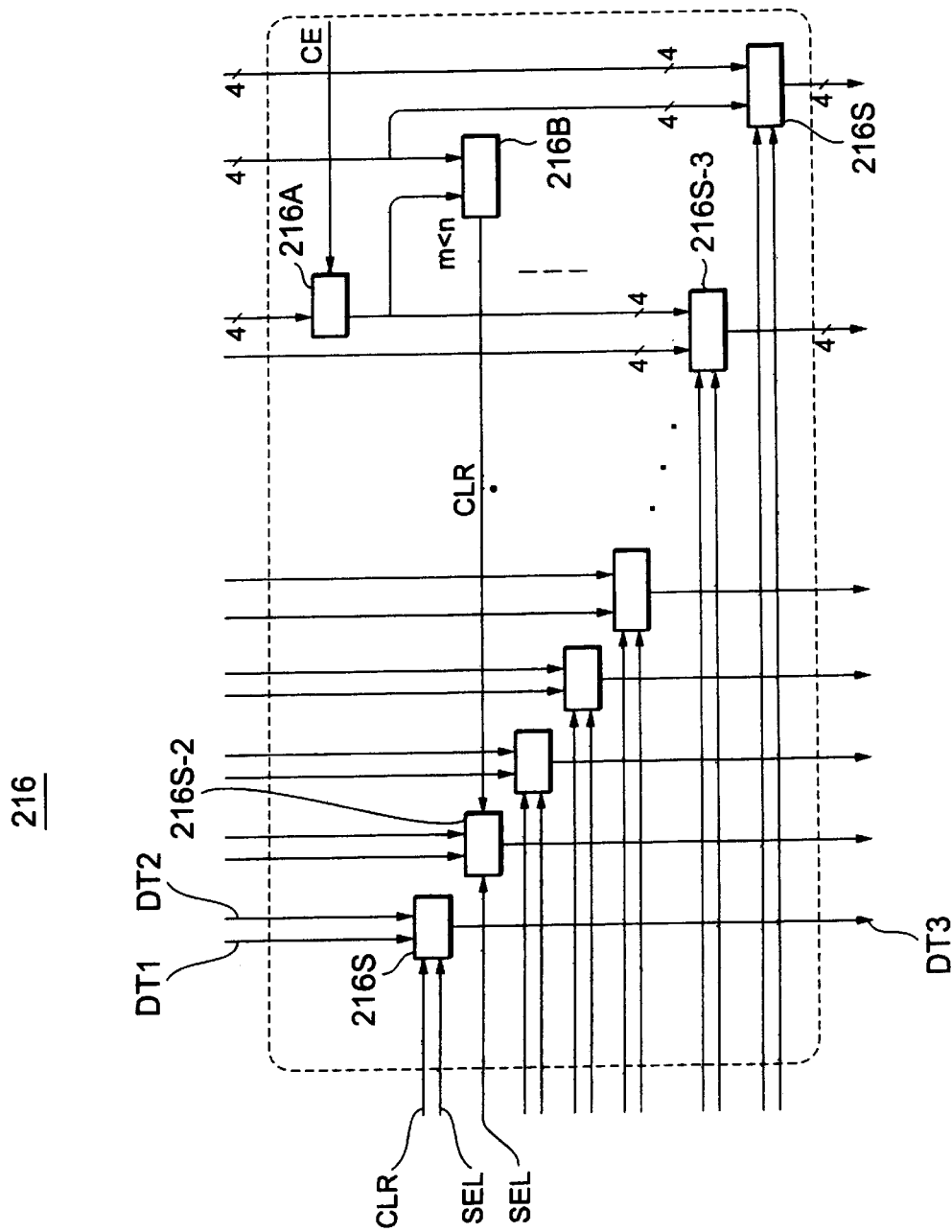
FIG. 13 is a block diagram showing a command generating means 216 according to a second preferred embodiment of the present invention.

The command generation means 216 has selectors 216s (including a selector 216S-2, a selector 216S-3, and a selector 216S-4) each of which corresponds to respective bits of a command code, as shown in FIG. 13. In order to simplify explanation, illustration of a part of selector 216s is omitted. Moreover, the selector 216S-3 and the selector 216S-4 consist of 4 bits. FIG. 13 shows a case where a command code is 16 bits.

Each selector 216s except for the selector 216s-2 receives a clear signal CLR, which clears the bit of the command code output from the command decoder 221, and an output data selection signal SEL output from the command decoder 221. The selector 216s-2 receives a clear signal CLR, which clears the bit of the command code output from a comparison circuit 216b, and the output data selection signal SEL output from the command decoder 221.

Each selector 216s further receives the command code, i.e., a data DT1 stored in the address location at which the control device 112 now identifies output from the memory device 111. Each selector 216s also receives a data DT2 corresponding to each bit of the command storing register 215.

Each selector 216s which constitutes the command generation means 216 outputs either the data DT1 read from the memory device 111 or the data DT2 output from the command storing register 215 as a data DT3 in response to the state of a select signal. When each selector 216s receives the clear signal CLR, the selector 216s outputs data "0" as the data DT3 regardless of the data DT1 and the data DT2. Each data DT3 is output to corresponding bit of the command storing register 215.

The command generation means 216 also includes an adder circuit 216a consisted of 4 bit and a comparison circuit 216b consisted of 4 bits. The adder circuit 216a receives 4 bits data from n field of the command storing register 215 and a count up enable signal CE output from the command decoder 221. An output of the adder circuit 216a is transferred to the comparison circuit 216b and the selector 216s-3. An output of the selector 216s-3 is inputted into the n field of the command storing register 215.

The comparison circuit 216b receives the output of the adder circuit 216a and 4 bits data from m field of the command storing register 215. The comparison circuit 216b judges whether an condition m<n is satisfied. When this condition is satisfied, the comparison circuit 216b outputs the clear signal CLR to the selector 216s-2.

According to such structure, a plurality of commands can be continuously executed by fetching the command at one time. For example, the data writing to the register files (R0, R1, R2, . . . ) or successive address locations in the memory device can be performed.

(Command Storing Register 215)

The command storing register 215 comprises latch circuits for storing bits which constitute a command code. That is, the command storing register 215 has two or more latch circuits which input and latch data DT3. Each bit of the command storing register 215 is set to "1" or is reset "0" by the data DT3 output from the command generation means 216.

(Command Decoder 221)

The command decoder 221 transfers a control signal for executing the command to the register file 122 and the address register 126. The command decoder 221 further transfers a control signal which indicates whether to generate another command from the decoded command in the ID state part 120 to the command generation means 216. This control signal is a request for setting each bit of the command field 70 mentioned later to "1" or for resetting them to "0". The structure of the command decoder 221 is suitably designed according to the kind of command stored in the memory device 111. The detail structure of the command decoder 221 is explained with reference to FIG. 17.

An operation of the command processing device 200 is explained below. In this embodiment, an example where the following command stored in the memory device 111 is executed by using the command generation means 216 is explained. This command is called comand PUSH hereinafter.

PUSH Rn-Rm

It is noted that the command PUSH of this embodiment is different from the command PUSH of the first preferred embodiment.

This command PUSH Rn-Rm is a command for storing from the contents of the register file identified by the n field to the contents of the register file identified by the m field into the RAM 123 which is accessed by the contents of the register file identified by the field 71.

Figure 14:
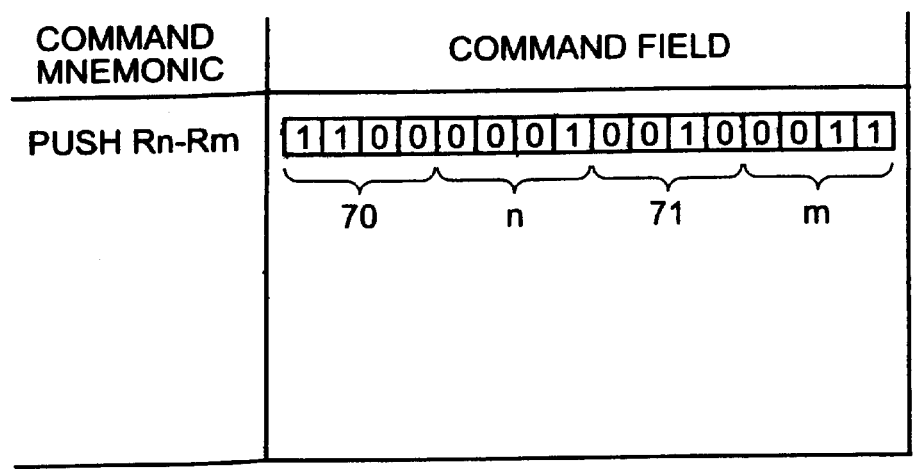
FIG. 14 is a figure explaining a command PUSH.

The structure of each field is shown in FIG. 14. As shown in FIG. 14, the command field is made up of the field 70, the n field, the field 71, and the m field. Each field consists of 4 bits. The n field shows the execution start number of the command, and the m field shows the execution end number of the command. The contents of the n field and the m field function as an address for specifying a register file.

In order to perform the command PUSH Rn-Rm, a command MOV AR, Rx, a command PUSH Rn, and a command LOD are sequentially executed. The command MOV AR, Rx, the command PUSH Rn, and the command LOD are explained with reference to FIG. 15. The command MOV AR, Rx, the command PUSH Rn, and the command LOD are distinguished by the value of the command field 70 as shown in FIG. 15.

The command MOV AR, Rx is a command executed when the value of the command field 70 is 1111. The command MOV AR, Rx performs the following operation.

(Operation 1)

The contents of the register file identified by the field 71 are transferred to the address register 126.

(Operation 2)

A request that the lowest bit of the command field 70 is cleared to 0 is issued to the command generation means 216. The request of clearing the lowest bit of the command field 70 to 0 changes the value of the command field 70 to 1110 from 1111. When 1110 of the command field 70 is set to the 13th through the 16th bit of the command storing register 215 through the command generation means 216, the command next executed will change from the command MOV AR, RX to the command PUSH Rn. That is, performing the request which clears the lowest bit of the command field 70 to 0 means that the following command is changed from the command MOV AR, RX to the command PUSH Rn.

The contents of a register file, identified by the n field, are transferred to the specific address location of the memory device 111, by which the address register 126 is identified.

(Operation 1)

The contents of a register file identified by the n field are transferred to the specific address location of the memory device 111 by which the address register 126 identified.

(Operation 2)

Counting up request for counting up the value of the n field is issued against the command generation means 216.

The command LOD is a command that is executed when the value of the command field 70 is 1010. The command LOD performs the following operation.

(Operation 1)

The contents of the address register 126 are transferred to the register file identified by the field 71.

(Operation 2)

The request that the command generation means 216 fetches a new command from the memory device 111 specified by the control device 112 is issued to the command generation means 216. The notice that the command PUSH Rn-Rm is completed is issued to the command generation means 216.

Next, the structure of the command decoder 221 of this embodiment is explained with reference to FIG. 17.

(Command Decoder 221)

While the command decoder 221 transfers a control signal for executing the command the EX state part 130, it transfers a control signal which determines whether to generate another command code from the command code to the command generating means 216. This control signal is set/reset request against each bit of the command field 70.

Figure 17:
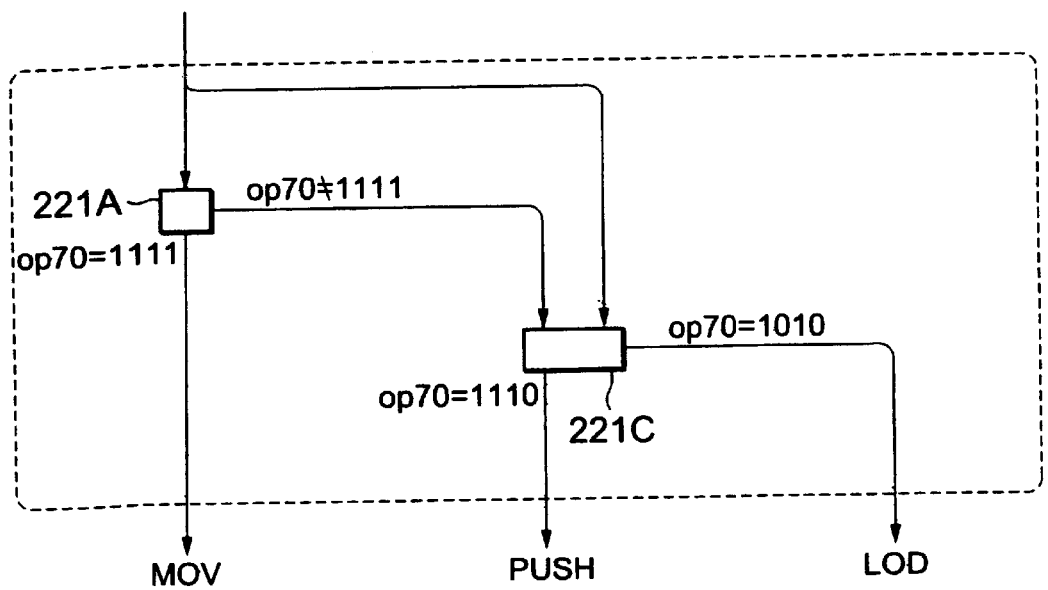
FIG. 17 is a block diagram showing a command decoder 221 according to a second preferred embodiment of the present invention.
Figure 18:
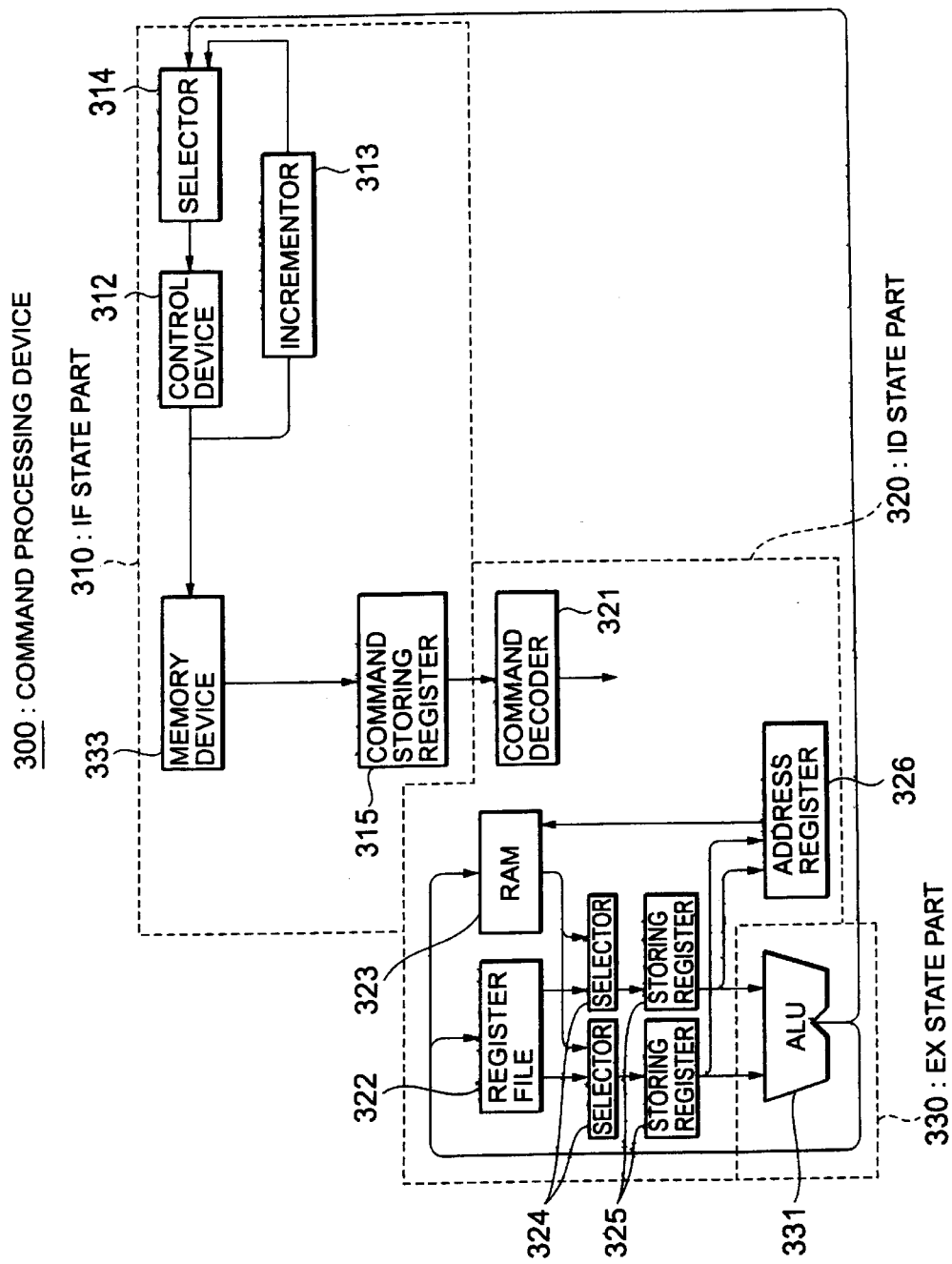
FIG. 18 is a block diagram showing a conventional command processing device 300.
Figure 19:
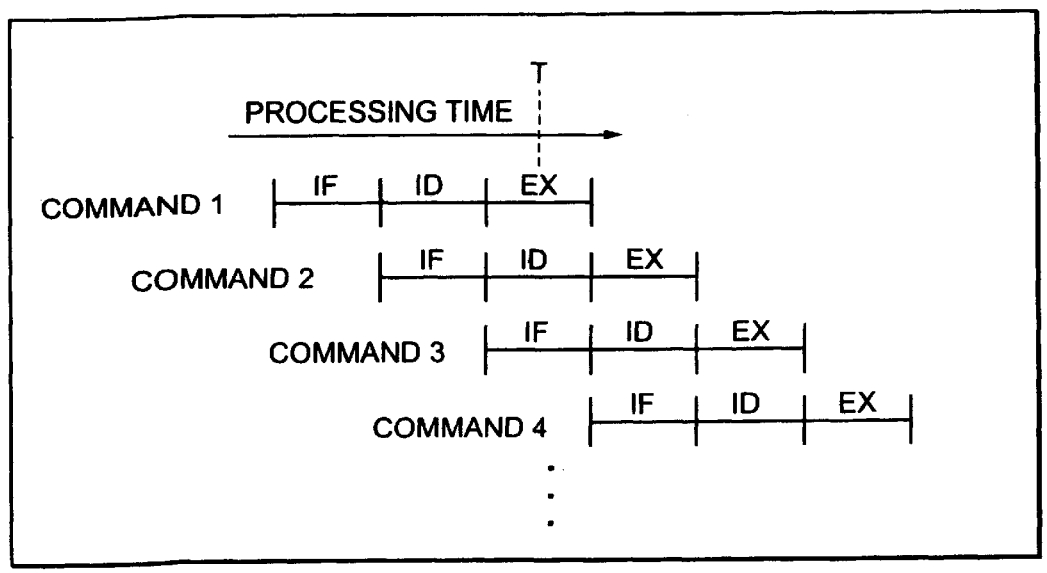
FIG. 19 is a timing chart showing a processing time of command processing device 300.

As shown in FIG. 17, the command decoder 221 is made up of a command judging circuit 221a which judges the value of the field 70, and a command judging circuit 221b. The command judging circuit 221a receives the value of the command field 70.

When the value of the command field 70 is 1111, the command judging circuit 221a outputs a control signal MOV for executing the command MOV AR, RX as shown in FIG. 15 to the register file 122, the address register 126, and the command generation means 216.

When the value of the field 70 is not 1111, the command judging circuit 221a outputs this information to the command judging circuit 221b. When the value of the field 70 is 1110, the command judging circuit 221b outputs a control signal PUSH for performing the command PUSH Rn shown in FIG. 15.

When the value of the field 70 is 1010, the command judging circuit 221b outputs a control signal LOD for executing the command LOD shown in FIG. 15.

Figure 16:
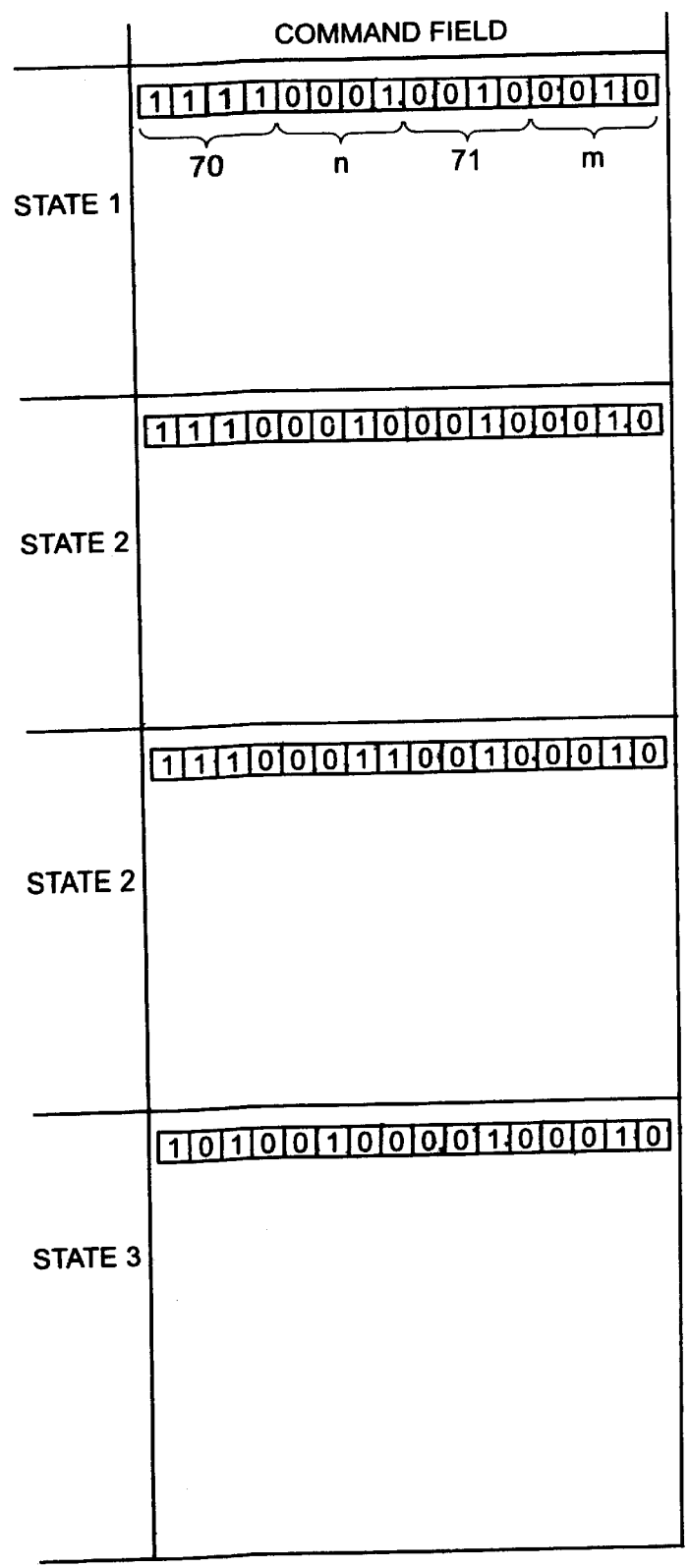
FIG. 16 is a table explaining a command processing flow according to a second preferred embodiment of the present invention.

Next, the actual flow for processing a command is explained with reference to FIG. 16. The 16 bits command code read from the memory device 111 is first stored in the command storing register 215 through the command generation means 216. The command code stored in the command storing register 115 is decoded by the command decoder 221 as the command MOV AR, RX. Then, the EX state part 130 executes the command MOV AR, RX. The contents of the register file identified by the field 71 are transferred to the address register 126. At this time, the command decoder 221 outputs the control signal (clear signal CLR) for clearing the lowest bit of the command field 70 to 0 to the command generation means 216. The command generation means 216 resets corresponding outputs DT3 of the selector 216s to 0 in response to the clear signal CLR. In addition, the command generation means 216 has received the output of the command storing register 215. Therefore, the bit which should not be cleared among the outputs DT2 of the command storing register 215 is transferred to the command storing register 215 as the output DT3 in response to the output data selection signal SEL. As a result, only the corresponding bit in the command storing register 215 is cleared to 0. That is, it means that the command code is rewritten into the command PUSH. The above operation is performed without reading a new command from the memory device 111. (State 1)

Next the rewritten command code stored in the command storing register is decoded by the command decoder 221 as the command PUSH Rn. Then, the EX state part 130 performs the command PUSH Rn. The contents of a register file identified by the n field are transferred to the specific address location of the RAM 123 identified by the address register 126. The counting up request for counting up the value of the n field is issued to the command generating means 216.

The adder circuit 216a within the command generation means 216 has received 0001 of the n field. After performing command PUSH Rn, the adder circuit 216a receives the count up enabel signal CE, and outputs 0010 to the selector 216s-3. Therefore, the contents of the n field of the command storing register 215 are rewritten into 0010. The comparison circuit 216b in the command generation means 216 holds 0010 of the m field. Since the output 0010 of adder circuit 216a is not over 0010 in which the comparison circuit 216b holds, the comparison circuit 216b does not yet output the clear signal CLR.

Then, the command PUSH Rn+1 is performed in the EX state part 130 as well. The contents of a register file identified by the n field are transferred to the specific address location of the RAM 123 identified by the address register 126. The counting up request for counting up the value of the n field is issued to the command generating means 216.

The adder circuit 216a in the command generation means 216 has received 0010 of the n field. After performing the command PUSH Rn+1, the adder circuit 216a receives the count up enable signal CE, and outputs 0011 to the selector 216s-3. Therefore, the contents of the n field of the command storing register 215 are rewritten into 0011. Since the output 0011 of the adder circuit 216a exceeds 0010 which the comparison circuit 216b holds, the comparison circuit 216b outputs the clear signal CLR to the selector 216s-2. The above operation performs also without reading a new command from the memory device 111. (State 2)

The corresponding output DT3 of the selector 216s-2 is reset to 0 in response to the clear signal CLR. The command generation means 216 has received the output of the command storing register 215. Therefore, the bit which should not be cleared among the outputs DT2 of the command storing register 215 is transferred to the command storing register 215 as the output DT3 in response to the output data selection signal SEL. As a result, only the corresponding bit of the command storing register 215 is cleared to 0. That is, it means that the command code is rewritten into the command LOD.

Next, the rewritten command code stored in the command storing register 215 is decoded by the command decoder 221 as the command LOD. Then, the EX state part 130 executes the command LOD. The contents of the address register 126 are transferred to the register file identified by the field 71. At this time, the command decoder 221 notifies that the command PUSH Rn-Rn+1 is completed to the command generating means 216 and also requests the command generation means 216 to read a new command from the memory device 111 specified by the control device 112. After this request, each sector 216s selects DT1 in response to the output data selection signal SEL. The above operation performs also without reading a new command from the memory device 111. (State 3)

According to this embodiment, the following effects are expectable. That is, a plurality of commands can be sequentially executed by fetching the command at a time. For example, writing data into successive address locations of maximum 2n in the memory device, where n is number of bits of n field, can be performed. Therefore, the memory can be used efficiently when programming is executed.

Since it is possible to reduce the number of times which reads the command from the memory device according to this invention, the processing speed of the command does not depend on the read out time of the command from memory device For this reason, efficient command processing is possible.

Moreover, like RISC command, the complex command code is processed in a state that the bit length of its is fixed. Therefore, the complicated mechanism like when decoding a command of a variable length command set is not needed. For this reason, according to this embodiment, circuit area and cost can be reduced.

Furthermore, a means for generating the following command can be obtained by using a relatively simple logic circuit, without using the local memory such as a cache memory having a high-speed interface function. Therefore, according to this embodiment, circuit area can be reduced.

While the preferred form of the present invention has been described, it is to be understood that modifications will be apparent to those skilled in the art without departing from the spirit of the invention. The scope of the invention is to be determined solely by the following claims.

What is claimed is:

1. A command processing device comprising:
   a first storing circuit which stores a command;
   a decode circuit which decodes the command from the first storing circuit and which outputs a decoded command and a control signal;
   a generating circuit which receives the command from the first storing circuit, which generates a new command in response to the control signal, and which outputs the new command to the first storing circuit; and
   a second storing circuit which stores an original command, wherein the generating circuit receives the original command from the second storing circuit and outputs the original command to the first storing circuit.

2. A command processing device as set forth in claim 1, wherein each command is comprised of a plurality of bits.

3. A command processing device as set forth in claim 2, wherein the generating circuit includes selectors, each of which outputs either a corresponding bit of the command from the first storing circuit or a corresponding bit of the command from the second storing circuit in response to the control signal.

4. A command processing device as set forth in claim 3, wherein each selector sets or resets the corresponding bit according to the control signal, thereby the command output from the generating circuit is changed.

5. A command processing device as set forth in claim 4, wherein the control signal comprises a selection signal and a clear signal, wherein each selector transfers either the command from the first storing circuit or the command from the second storing circuit in response to the selection signal, and wherein each selector outputs data 0 or data 1 in response to the clear signal.

6. A command processing device comprising:

a first storing circuit which stores a command;

a decode circuit which decodes the command from the first storing circuit and which outputs a decoded command and a control signal;

a generating circuit which receives the command from the first storing circuit and which generates a new command from the received command of the first storing circuit in response to the control signal and which outputs the new command to the first storing circuit; and a second storing circuit which stores an original command, wherein the generating circuit receives the original command from the second storing circuit and outputs the original command to the first storing circuit.

7. A command processing device as set forth in claim 6, wherein each command is comprised of a plurality of bits, wherein the generating circuit includes selectors each of which outputs either a corresponding bit of the command from the first storing circuit or a corresponding bit of the command from the second storing circuit in response to the control signal.

8. A command processing device as set forth in claim 7, wherein each selector sets or resets the corresponding bit according to the control signal, thereby the command output from the generating circuit is changed.

9. A command processing device as set forth in claim 8, wherein the control signal comprises a selection signal and a clear signal, wherein each selector transfers either the command from the first storing circuit or the command from the second storing circuit in response to the selection signal, and wherein each selector outputs data 0 or data 1 in response to the clear signal.

* * * * *